US011151427B2

(12) United States Patent
Wu (10) Patent No.: US 11,151,427 B2
(45) Date of Patent: Oct. 19, 2021

(54) METHOD AND APPARATUS FOR CHECKOUT BASED ON IMAGE IDENTIFICATION TECHNIQUE OF CONVOLUTIONAL NEURAL NETWORK

(71) Applicant: Yi Tunnel (Beijing) Technology Co., Ltd., Beijing (CN)

(72) Inventor: Yili Wu, Beijing (CN)

(73) Assignee: YI TUNNEL (BEIJING) TECHNOLOGY CO., LTD., Beijing (CN)

(*) Notice: Subject to any disclaimer, the term of this patent is extended or adjusted under 35 U.S.C. 154(b) by 417 days.

(21) Appl. No.: 16/328,948

(22) PCT Filed: Dec. 11, 2017

(86) PCT No.: PCT/CN2017/115443
§ 371 (c)(1),
(2) Date: Feb. 27, 2019

(87) PCT Pub. No.: WO2019/019525
PCT Pub. Date: Jan. 31, 2019

(65) Prior Publication Data
US 2019/0244055 A1    Aug. 8, 2019

(30) Foreign Application Priority Data

Jul. 24, 2017  (CN) .......................... 201710607759.X
Oct. 25, 2017  (CN) .......................... 201711008973.X (51) Int. Cl.
*G06K 9/62*  (2006.01)
*G06K 9/00*  (2006.01)
(Continued)

(52) U.S. Cl.
CPC ......... *G06K 9/628* (2013.01); *G06K 9/00624* (2013.01); *G06K 9/32* (2013.01);
(Continued)

(58) Field of Classification Search
CPC .... G06K 9/628; G06K 9/00624; G06K 9/627; G07G 1/0036
(Continued)

(56) References Cited

U.S. PATENT DOCUMENTS

2016/0321335 A1    11/2016  Noguchi
2018/0218351 A1*   8/2018   Chaubard .............. H04N 7/181

FOREIGN PATENT DOCUMENTS

CN    102063616 A    5/2011
CN    102855713 A    1/2013
(Continued)

OTHER PUBLICATIONS

International Search Report dated Apr. 18, 2018 in corresponding International Application No. PCT/CN2017/115443 filed Dec. 11, 2017, 10 pages (with English Translation).

*Primary Examiner* — Jeffery A Williams
(74) *Attorney, Agent, or Firm* — Global IP Counselors, LLP (57) ABSTRACT

A method for checkout based on an image identification technique of convolutional neural network includes acquiring N pictures of M items to be classified placed on a checkout counter, N shooting angles corresponding to the N pictures have at least one shooting angle for taking pictures downwards from just above, performing object detection in the pictures acquired downwards from just above to obtain first rectangular area images, then respectively performing the object detection in remaining pictures according to the number of the pictures to obtain remaining rectangular area images, obtaining preliminary classification results according to the first rectangular area images, the remaining rectangular area images and a pre-trained first-level classification model, and obtaining first-level classification results according to the preliminary classification results and a pre-trained first-level linear regression model, using the (Continued)

first-level classification results as first classification results and performing checkout according to the first classification results.

10 Claims, 4 Drawing Sheets

(51) Int. Cl.
| | |
|---|---|
| *G07G 1/00* | (2006.01) |
| *H04N 5/247* | (2006.01) |
| *G06Q 20/20* | (2012.01) |
| *G06K 9/32* | (2006.01) |
| *G06N 3/08* | (2006.01) |
| *G06N 3/04* | (2006.01) |

(52) U.S. Cl.
CPC .............. *G06K 9/3233* (2013.01); *G06K 9/62* (2013.01); *G06K 9/627* (2013.01); *G06K 9/6215* (2013.01); *G06K 9/6269* (2013.01); *G06N 3/04* (2013.01); *G06N 3/08* (2013.01); *G06Q 20/208* (2013.01); *G07G 1/0036* (2013.01); *H04N 5/247* (2013.01)

(58) Field of Classification Search
USPC ........................................................ 348/150
See application file for complete search history.

(56) References Cited

FOREIGN PATENT DOCUMENTS

| | | |
|---|---|---|
| CN | 103412938 A | 11/2013 |
| CN | 103632460 A | 3/2014 |

\* cited by examiner

```
┌─────────────────────────────────────────────────────────────────────────┐
│ acquiring N pictures of M items to be classified placed on a checkout   │ 101
│ counter, wherein the N pictures correspond to N shooting angles one to  │
│ one, the N shooting angles have at least one first shooting angle, and  │
│ the first shooting angle is the shooting angle for shooting the M items │
│ downwards from a position just above the M items, wherein M and N are   │
│ natural numbers greater than or equal to 2                              │
└─────────────────────────────────────────────────────────────────────────┘
                                      │
                                      ▼
┌─────────────────────────────────────────────────────────────────────────┐
│ performing an object detection in the picture acquired at the first     │ 102
│ shooting angle firstly to obtain M first rectangular area images        │
│ corresponding to the M items one to one, and performing the object      │
│ detection in the remaining pictures of the N pictures respectively, to  │
│ obtain M remaining rectangular area images corresponding to the M items │
│ one to one in each of the pictures, according to the number of the      │
│ first rectangular area images, wherein the first rectangular area       │
│ images are rectangular area images containing the items, and the        │
│ remaining rectangular area images are rectangular area images           │
│ containing the items                                                    │
└─────────────────────────────────────────────────────────────────────────┘
                                      │
                                      ▼
┌─────────────────────────────────────────────────────────────────────────┐
│ obtaining N preliminary classification results corresponding to each of │ 103
│ the items according to the first rectangular area images, the remaining │
│ rectangular area images and a pre-trained first-level classification    │
│ model, and obtaining a first-level classification result corresponding  │
│ to each of the items according to the N preliminary classification      │
│ results corresponding to each of the items and a pre-trained first-     │
│ level linear regression model, wherein the first-level classification   │
│ model is a model that is constructed by the image identification        │
│ technique of convolutional neural network and trained by all the items  │
│ in the shopping place                                                   │
└─────────────────────────────────────────────────────────────────────────┘
                                      │
                                      ▼
┌─────────────────────────────────────────────────────────────────────────┐
│ using the first-level classification result corresponding to each of    │ 104
│ the items as a first classification result of each of the items         │
└─────────────────────────────────────────────────────────────────────────┘
                                      │
                                      ▼
┌─────────────────────────────────────────────────────────────────────────┐
│ performing checkout of the M items according to the first               │ 105
│ classification result of each of the items                              │
└─────────────────────────────────────────────────────────────────────────┘
```

```
┌─────────────────────────────────────────────────────────────────────────┐
│ acquiring N pictures of M items to be classified placed on a checkout   │ 201
│ counter, wherein the N pictures correspond to N shooting angles one to  │
│ one, the N shooting angles have at least one first shooting angle,      │
│ and the first shooting angle is the shooting angle for shooting the M   │
│ items downwards from a position just above the M items                  │
└─────────────────────────────────────────────────────────────────────────┘
                                    │
┌─────────────────────────────────────────────────────────────────────────┐
│ performing an object detection in the picture acquired at the first     │ 202
│ shooting angle firstly to obtain M first rectangular area images        │
│ corresponding to the M items one to one, and performing the object      │
│ detection in the remaining pictures of the N pictures respectively, to  │
│ obtain M remaining rectangular area images corresponding to the M       │
│ items one to one in each of the pictures, according to the number of    │
│ the first rectangular area images                                       │
└─────────────────────────────────────────────────────────────────────────┘
                                    │
┌─────────────────────────────────────────────────────────────────────────┐
│ obtaining N preliminary classification results corresponding to each of │ 203
│ the items according to the first rectangular area images, the           │
│ remaining rectangular area images and a pre-trained first-level         │
│ classification model, wherein the first-level classification model is   │
│ a model that is constructed by the image identification technique of    │
│ convolutional neural network and trained by all the items in the        │
│ shopping place                                                          │
└─────────────────────────────────────────────────────────────────────────┘
                                    │
┌─────────────────────────────────────────────────────────────────────────┐
│ obtaining a first-level classification result corresponding to each of  │
│ the items according to the N preliminary classification results         │
│ corresponding to each of the items and a pre-trained first-level linear │ 204
│ regression model, and in case that the first-level classification       │
│ result indicates a similar item, performing step 205; otherwise, using  │
│ the first-level classification result corresponding to each of the      │
│ items as a first classification result of each of the items             │
└─────────────────────────────────────────────────────────────────────────┘
                                    │
┌─────────────────────────────────────────────────────────────────────────┐
│ obtaining N secondary classification results corresponding to a similar │
│ item according to the first rectangular area image and the remaining    │
│ rectangular area image corresponding to the similar item, and a         │
│ pre-trained second-level classification model, obtaining a second-level │ 205
│ classification result corresponding to the similar item according to    │
│ the N secondary classification results and a pre-trained second-level   │
│ linear regression model, and using the second-level classification      │
│ result as the first classification result of the similar item and       │
│ performing the confirmation step, wherein the second-level              │
│ classification model is a model that is constructed by the image        │
│ identification technique of convolutional neural network and            │
│ pre-trained by similar items in the shopping place                      │
└─────────────────────────────────────────────────────────────────────────┘
                                    │
┌─────────────────────────────────────────────────────────────────────────┐
│ determining whether the item in the pictures is consistent with the     │ 207
│ first classification result according to the first rectangular area     │
│ image and the remaining rectangular area image corresponding to each    │
│ of the items, and a pre-trained support vector machine model            │
│ corresponding to the first classification result of each of the items,  │
│ and in case that the item in the images is consistent with the first    │
│ classification result, performing step 206; otherwise, reminding a      │
│ customer that the item is out of stock                                  │
└─────────────────────────────────────────────────────────────────────────┘
                                    │                                      206
┌─────────────────────────────────────────────────────────────────────────┐
│ performing checkout of the M items according to the first               │
│ classification result of each of the items                              │
└─────────────────────────────────────────────────────────────────────────┘
```

METHOD AND APPARATUS FOR CHECKOUT BASED ON IMAGE IDENTIFICATION TECHNIQUE OF CONVOLUTIONAL NEURAL NETWORK

CROSS-REFERENCE TO RELATED APPLICATION

This application is a U.S. National Stage application of International Application No. PCT/CN2017/115443, filed Dec. 11, 2017, which claims priority to Chinese Patent Application No. 201710607759.X, filed Jul. 24, 2017 and Chinese Patent Application No. 201711008973.X, filed Oct. 25, 2017, the contents of each of which are hereby incorporated herein by reference.

BACKGROUND

Field of Invention

The present invention belongs to the technical field of image identification, and in particular relates to a method and apparatus for checkout based on the image identification technique of convolutional neural network.

Background of the Invention

When customers see an item they like or need in shopping places such as supermarkets and restaurants, they need to perform checkout at the checkout counter to get them.

In the prior art, there are two commonly used checkout methods. The first method is a barcode-based checkout method, in which the item is identified by scanning the barcode on the item, and checkout of the identified item is performed. The scanning operation is completed by the cashier or by the customer himself. The method has the following defects. Scanning is troublesome and labor-intensive, and has certain requirements for operation. Generally only one item can be scanned at one time, but multiple items cannot be scanned at the same time, and thus the efficiency is low. The second method is an RFID-based checkout method, in which one small radio-frequency module that does not require a battery is attached to the item, and when the item passes through the checkout counter, the checkout counter transmits a wireless signal to the item, the small radio frequency module receives the signal and then feeds back one signal carrying the ID information of the item to the checkout counter, and then checkout is performed accordingly. This method has the following defects. It is troublesome to attach the small radio-frequency module to each of the items. If the small radio-frequency module falls off from the item, whether it naturally falls off or is artificially torn off, the corresponding losses will be caused to the merchant. In addition, when the item is a metal item, if RFID is attached thereto, there may be a problem that the signal is shielded.

SUMMARY

In order to at least solve the problems existing in the prior art, in one aspect, the present invention provides a checkout method based on the image identification technique of convolutional neural network, comprising: an acquisition step for acquiring N pictures of M items to be classified placed on a checkout counter, wherein the N pictures correspond to N shooting angles one to one, the N shooting angles have at least one first shooting angle, and the first shooting angle is the shooting angle for shooting the M items downwards from a position just above the M items; an object detection step for firstly performing an object detection in the picture acquired at the first shooting angle to obtain M first rectangular area images corresponding to the M items one to one, and performing the object detection in the remaining pictures of the N pictures respectively, to obtain M remaining rectangular area images corresponding to the M items one to one in each of the pictures, according to the number of the first rectangular area images; a first classification step for obtaining N preliminary classification results corresponding to each of the items according to the first rectangular area images, the remaining rectangular area images and a pre-trained first-level classification model, and obtaining a first-level classification result corresponding to each of the items according to the N preliminary classification results corresponding to each of the items and a pre-trained first-level linear regression model, wherein the first-level classification model is a model that is constructed by the image identification technique of convolutional neural network and trained by all the items in the shopping place; a confirmation step for using the first-level classification result corresponding to each of the items as a first classification result of each of the items; and a checkout step for performing checkout of the M items according to the first classification result of each of the items, wherein M and N are natural numbers greater than or equal to 2.

In the above-mentioned checkout method, preferably, after the first classification step and before the confirmation step, the checkout method further comprises: a second classification step for obtaining N secondary classification results corresponding to a similar item according to the first rectangular area image and the remaining rectangular area image corresponding to the similar item, and a pre-trained second-level classification model, obtaining a second-level classification result corresponding to the similar item according to the N secondary classification results and a pre-trained second-level linear regression model, and using the second-level classification result as the first classification result of the similar item and performing the confirmation step, in case that the first-level classification result indicates the similar item, wherein the second-level classification model is a model that is constructed by the image identification technique of convolutional neural network and pre-trained by similar items in the shopping place.

In the above-mentioned checkout method, preferably, after the confirmation step and before the checkout step, the checkout method further comprises: determining whether the item in the pictures is consistent with the first classification result according to the first rectangular area image and the remaining rectangular area image corresponding to each of the items, and a pre-trained support vector machine model corresponding to the first classification result of each of the items, in case that the item in the images is consistent with the first classification result, performing the checkout step; otherwise, reminding a customer that the item is out of stock.

In the above-mentioned checkout method, preferably, one camera is disposed just above the M items to be classified, so as to acquire the picture by shooting the M items downwards from just above; and four cameras are disposed around the M items to be classified, so as to acquire the pictures by shooting the M items obliquely downwards.

In another aspect, the present invention provides a checkout apparatus based on the image identification technique of convolutional neural network, comprising: an acquisition device configured to acquire N pictures of M items to be classified placed on a checkout counter, wherein the N pictures correspond to N shooting angles one to one, the N shooting angles have at least one first shooting angle, and the first shooting angle is the shooting angle for shooting the M items downwards from a position just above the M items; an object detection device configured to perform an object detection in the picture acquired at the first shooting angle firstly to obtain M first rectangular area images corresponding to the M items one to one, and perform the object detection in the remaining pictures of the N pictures respectively, to obtain M remaining rectangular area images corresponding to the M items one to one in each of the pictures, according to the number of the first rectangular area images; a first classification device configured to obtain N preliminary classification results corresponding to each of the items according to the first rectangular area images, the remaining rectangular area images and a pre-trained first-level classification model, and obtain a first-level classification result corresponding to each of the items according to the N preliminary classification results corresponding to each of the items and a pre-trained first-level linear regression model, wherein the first-level classification model is a model that is constructed by the image identification technique of convolutional neural network and trained by all the items in the shopping place; a confirmation device configured to use the first-level classification result corresponding to each of the items as a first classification result of each of the items; and a checkout device configured to perform checkout of the M items according to the first classification result of each of the items, wherein M and N are natural numbers greater than or equal to 2.

In the above-mentioned checkout apparatus, preferably, the checkout apparatus further comprises: a second classification device configured to obtain N secondary classification results corresponding to a similar item according to the first rectangular area image and the remaining rectangular area image corresponding to the similar item, and a pre-trained second-level classification model, obtain a second-level classification result corresponding to the similar item according to the N secondary classification results and a pre-trained second-level linear regression model, and use the second-level classification result as the first classification result of the similar item, in case that the first-level classification result indicates the similar item, wherein the second-level classification model is a model that is constructed by the image identification technique of convolutional neural network and pre-trained by similar items in the shopping place; correspondingly, in case that the first-level classification result indicates a similar item, the checkout device performs checkout according to the second-level classification result obtained by the second classification device; otherwise, the checkout device performs checkout according to the first-level classification result obtained by the first classification device.

In the above-mentioned checkout apparatus, preferably, the checkout apparatus further comprises: a determination device configured to determine whether the item in the pictures is consistent with the first classification result according to the first rectangular area image and the remaining rectangular area image corresponding to each of the items, and a pre-trained support vector machine model corresponding to the first classification result of each of the items; and a selection device configured to call the checkout device, in case that the item in the images is consistent with the first classification result; otherwise, remind a customer that the item is out of stock.

In the above-mentioned checkout apparatus, preferably, the acquisition device is cameras, wherein one camera is disposed just above the M items to be classified, so as to acquire the picture by shooting the M items downwards from just above; and four cameras are disposed around the M items to be classified, so as to acquire the pictures by shooting the M items obliquely downwards.

In another aspect, the present invention provides a checkout apparatus based on the image identification technique of convolutional neural network, comprising: N cameras used for acquiring N pictures of M items to be classified placed on a checkout counter, wherein the N pictures correspond to N shooting angles one to one, the N shooting angles have at least one first shooting angle, and the first shooting angle is the shooting angle for shooting the M items downwards from a position just above the M items; a processor; and a memory that records processor-executable instructions, wherein the processor is configured to perform an object detection in the picture acquired at the first shooting angle firstly to obtain M first rectangular area images corresponding to the M items one to one, perform the object detection in the remaining pictures of the N pictures respectively, to obtain M remaining rectangular area images corresponding to the M items one to one in each of the pictures, according to the number of the first rectangular area images; obtain N preliminary classification results corresponding to each of the items according to the first rectangular area images, the remaining rectangular area images and a pre-trained first-level classification model, and obtain a first-level classification result corresponding to each of the items according to the N preliminary classification results corresponding to each of the items and a pre-trained first-level linear regression model, wherein the first-level classification model is a model that is constructed by the image identification technique of convolutional neural network and trained by all the items in the shopping place; using the first-level classification result corresponding to each of the items as a first classification result of each of the items; and perform checkout of the M items according to the first classification result of each of the items, wherein M and N are natural numbers greater than or equal to 2.

In the above-mentioned checkout apparatus, preferably, the processor is further configured to obtain N secondary classification results corresponding to a similar item according to the first rectangular area image and the remaining rectangular area image corresponding to the similar item, and a pre-trained second-level classification model, obtain a second-level classification result corresponding to the similar item according to the N secondary classification results and a pre-trained second-level linear regression model, and use the second-level classification result as the first classification result of the similar item, in case that the first-level classification result indicates the similar item, wherein the second-level classification model is a model that is constructed by the image identification technique of convolutional neural network and pre-trained by similar items in the shopping place; otherwise, use the first-level classification result as the first classification result.

The embodiments of the present invention bring out the following beneficial effects by adopting the above-mentioned technical solutions.

The items can be accurately identified, so as to facilitate the self-service checkout.

BRIEF DESCRIPTION OF THE DRAWINGS

The invention will be explained in more detail hereinafter with reference to the drawings.

FIG. 1 illustrates a schematic flowchart of a checkout method based on the image identification technique of convolutional neural network provided in an embodiment of the present invention;

FIG. 3 illustrates a schematic flowchart of a checkout method based on the image identification technique of convolutional neural network provided in another embodiment of the present invention.

DETAILED DESCRIPTION OF THE EMBODIMENTS

In order to enable the purposes, technical solutions and advantages of the present invention to be clearer, the embodiments of the present invention will be further described below in detail with reference to the drawings.

In order to improve checkout efficiency, the embodiments of the present invention are especially applicable to an application scenario in which a customer places M items on a checkout counter, wherein M is natural numbers greater than or equal to 2.

Referring to FIG. 1, one embodiment of the present invention provides the checkout method based on the image identification technique of convolutional neural network, comprising:

an acquisition step 101 for acquiring N pictures of M items to be classified placed on a checkout counter, wherein the N pictures correspond to N shooting angles one to one, the N shooting angles have at least one first shooting angle, the first shooting angle is the shooting angle for shooting the M items downwards from a position just above the M items, and N is natural numbers greater than or equal to 2;

an object detection step 102 for firstly performing an object detection in the picture acquired at the first shooting angle to obtain M first rectangular area images corresponding to the M items one to one, and performing the object detection in remaining pictures of the N pictures respectively, to obtain M remaining rectangular area images corresponding to the M items one to one in each of the pictures, according to the number of the first rectangular area images, wherein the remaining rectangular area images are rectangular area images containing the items;

a first classification step 103 for obtaining N preliminary classification results corresponding to each of the items according to the first rectangular area images, the remaining rectangular area images and a pre-trained first-level classification model, and obtaining a first-level classification result corresponding to each of the items according to the N preliminary classification results corresponding to each of the items and a pre-trained first-level linear regression model, wherein the first-level classification model is a model that is constructed by the image identification technique of convolutional neural network and trained by all the items in the shopping place;

a confirmation step 104 for using the first-level classification result corresponding to each of the items as a first classification result of each of the items; and a checkout step 105 for performing checkout of the M items according to the first classification result of each of the items.

To sum up, it can be known which item is the item by acquiring the pictures of the plurality of items at the plurality of shooting angles, determining the number of the items by using the picture at the first shooting angle, acquiring the first rectangular area images, respectively performing, according to the number of the items, the object detection in the remaining pictures of the plurality of pictures to obtain the same number of remaining rectangular area images in each of the pictures, processing the plurality of first rectangular area images by using the first-level classification model to obtain one classification result of each of the items, processing the plurality of remaining rectangular area images of each of the pictures of the remaining pictures of the plurality of pictures by using the first classification model to obtain some classification results of each of the items, in which the sum of the number of the classification results and the number (i.e., one) of the above-mentioned classification result is equal to the number of the pictures, and performing the data fusion to the plurality of classification results of each of the items to output one final result, i.e., processing by using the linear regression model. Correspondingly, it can be known which items are the items respectively, and thus the checkout efficiency is improved and the accuracy of identifying item is also improved.

Figure 2:
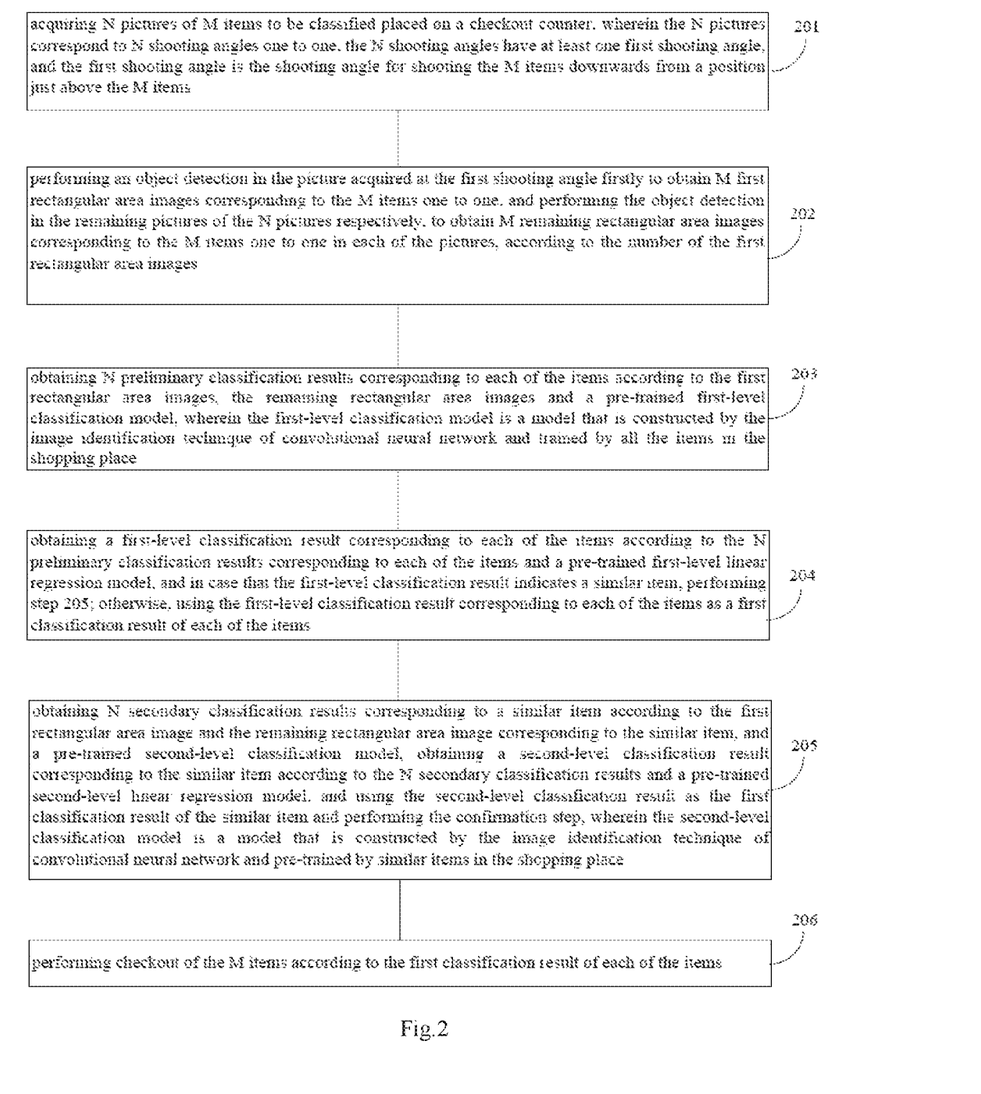
FIG. 2 illustrates a schematic flowchart of a checkout method based on the image identification technique of convolutional neural network provided in another embodiment of the present invention.

Referring to FIG. 2, another embodiment of the present invention provides the checkout method based on the image identification technique of convolutional neural network, which comprises the following steps 201 to 207.

In step 201, the N pictures of the M items to be classified placed on the checkout counter are acquired, wherein the N pictures correspond to the N shooting angles one to one, the N shooting angles have at least one first shooting angle and the first shooting angle is the shooting angle for shooting the M items downwards from a position just above the M items.

In this step, one picture can be acquired by shooting the item from a certain shooting angle. Since one shooting angle corresponds to one picture, pictures corresponding to different shooting angles can be acquired by changing different shooting angles. When the shooting angles are N, the N pictures can be acquired, such that key information for identifying the item can be captured, in which the key information refers to information which plays an important role in identifying (or called as classifying) the item from the appearance of the item. For example, when the item is mineral water, since there are many types of mineral waters, distinguishing from different types of mineral waters mainly depends on a pattern in a circle of plastic paper attached to a mineral water bottle, and this pattern is key information of the mineral waters.

N cameras are disposed on the checkout counter in such a way that N shooting angles are formed, N may be five, four or six, and the number of the cameras is the same as the number of the pictures for each of the items. In order to accurately identify M items, the N shooting angles have at least one shooting angle for shooting the M items downwards from a position just above the M items. This shooting angle is called as a first shooting angle, i.e., one camera is disposed just above the M items and takes pictures of the M items from just above. When the number N of the cameras is five, other four cameras may be uniformly disposed around the M items to be classified and all take pictures of the M items obliquely downwards. Alternatively, four cameras are uniformly disposed around the items to be classified, wherein two cameras take pictures of the M items obliquely downwards and other two cameras take pictures of the items obliquely upwards. In this embodiment, the number and arrangements of the cameras are not limited. Usually, the more the cameras are, the more the number of the acquired pictures are, the more the information of the item contained in the all the pictures is, and thus the classification of the item is facilitated. However, this will increase the hardware complexity and increase the computational amount. Therefore, the number of the cameras may be selected according to the actual situation.

It should be noted that the shooting angles herein may refer one factor of the shooting direction, may also refer to two factors of the shooting direction and shooting distance, and may further refer to other factors or factors in other numbers. In this embodiment, it is not limited.

Acquisition actions (or called as actions for taking pictures) may be triggered by a weighing scale disposed on the checkout counter. For example, the weighing scale is the weighing scale with a pressure sensor and whether to trigger shooting is decided according to a change in weight sensed by the weighing scale. When the weighing scale senses a change in weight and the change has already become stable, e.g., the weight does not change any longer within a preset time (i.e., a period of time in which a moment at which the weight changes is a start moment and the start moment plus preset time is an end moment), the cameras start to take pictures, and thus it can be guaranteed that the required pictures are taken, i.e., pictures are taken at a moment when a customer puts the item on the weighing scale. In other embodiments, actions for taking pictures by the cameras may be triggered by technical means, such as image identification and computer vision. Firstly, cameras continuously observe and shoot an area for placing items, and when it is found that a customer stretches a hand into the place, puts down one item and then takes the hand away, i.e., such action for placing the items is captured from a video, the start moment is recorded, and when such action is not captured any longer from the video within the preset time (i.e., a period of time in which the moment at which the action is captured is the start moment and the start moment plus the preset time is the end moment), an instruction for taking pictures is triggered, i.e., the cameras are triggered to take pictures.

In step 202, object detection is firstly performed for the picture acquired at the first shooting angle to obtain M first rectangular area images corresponding to the M items one to one, and the object detection is respectively performed for the remaining pictures of the N pictures according to the number of the first rectangular area images to obtain M remaining rectangular area images corresponding to the M items one to one in each of the pictures.

Specifically, the object detection is firstly performed in the picture acquired at the first shooting angle, when the object detection is performed, M rectangular frames (or called as rectangular areas) containing the items will be marked out on this picture, each rectangular frame contains one item, the image corresponding to the rectangular frame (or called as the first rectangular area image) is the image for classifying the item, it is output to step 203. The number of the rectangular frames is the same as the number of the items to be classified. Since there is no obstruction, the number of the items to be classified placed on the checkout counter can be accurately determined from the pictures acquired by taking pictures from the position just above the M items, the object detection is then performed to each of the pictures acquired at other shooting angles according to this number. When the object detection is performed, rectangular frames with the same number as the items are marked out on each of the pictures acquired at other shooting angles, each rectangular frame also contains one item, the image corresponding to the rectangular frame (or called as the remaining rectangular area image) is the image for classifying the items, and it is output to step 203. When the number M of the items is four, the number N of the images is five and the number of the picture acquired at the first shooting angle is one, four images corresponding to rectangular areas containing the items are acquired from the picture acquired at the first shooting angle, and thus four images corresponding to the rectangular areas containing the items are acquired from each of the pictures of the remaining four pictures.

In step 203, N preliminary classification results corresponding to each of the items are obtained according to the first rectangular area images, the remaining rectangular area images and a pre-trained first-level classification model, wherein the first-level classification model is a model that is constructed by the image identification technique of convolutional neural network and trained by all the items in the shopping place.

Specifically, data are collected to establish a data set, and the collecting of the data comprises: 1) shooting all items in the shopping place from each angle and in each attitude to acquire a great amount of photos; and 2) labeling those photos, i.e., labeling positions, sizes and categories of the items in the photos. The data included in the data set means the above-mentioned photos and labels on those photos. The first-level classification model is a model constructed by the image identification technique of convolutional neural network, and is trained by using the data of all items in the shopping place. The training can be carried out in a gradient descent mode.

The trained first-level classification model performs classification to the items in the M first rectangular area images or M remaining rectangular area images of each of the pictures. Since the number of the pictures is N, N primary classification results corresponding to each of the items are obtained, i.e., the number of the primary classification results is consistent with the number of the pictures. Each primary classification result is one O-dimensional vector, where O represents the total number of items in the shopping place. Each element in the vector represents a probability that the items to be classified belong to each of the O items according to the first-level classification model. When the number of the pictures is five, the number of the primary classification results is five O-dimensional vectors.

In step 204, a first-level classification result corresponding to each of the items is obtained according to the N preliminary classification results corresponding to each of the items and a pre-trained first-level linear regression model. In case that the first-level classification result indicates a similar item, step 205 is performed; otherwise, the first-level classification result corresponding to each of the items is used as the first classification result of each of the items.

Specifically, in step 203, when the first-level classification model is trained, the primary classification results outputted by the first-level classification model are used as inputs of the first-level linear regression model, and correct classifications of the items included in the images corresponding to the primary classification results are used as outputs of the first-level linear regression model, so as to train the first-level linear regression model. The trained first-level linear regression model performs data fusion to the N primary classification results of each of the items to obtain one first-level classification result corresponding to each of the items. The first-level classification result represents that the first-level linear regression model predicts to which category of item in the shopping place the certain item in the image belongs.

There are various items in the shopping place. Among the various items, there may be some items which are similar in appearance and may easily be visually confused. Such items are called as similar items, e.g., Golden Delicious apples and yellow snowflake pears. If a single to-be-classified item belongs to the similar items, the first-level classification model is difficult to accurately classify the items. For example, Golden Delicious apples are confused with yellow snowflake pears and Golden Delicious apples are classified as yellow snowflake pears. Therefore, the following step 205 needs to be performed. Otherwise, the first-level classification result is directly used as the first classification result for checkout.

In step 205, N secondary classification results corresponding to the similar item are obtained according to the first rectangular area image and the remaining rectangular area image corresponding to the similar item, and a pre-trained second-level classification model, then a second-level classification result corresponding to the similar item is obtained according to the N secondary classification results and a pre-trained second-level linear regression model, and the second-level classification result is used as the first classification result of the similar item, wherein the second-level classification model is the model that is constructed by the image identification technique of convolutional neural network and trained by the items in a similar item group in the shopping place.

Specifically, the second-level classification model is trained by using data of similar items in the data set established in step 203, and the training may be performed by adopting a gradient descent manner. The second-level classification model differs from the first-level classification model in that different data are used in the training process, in which the data used by the first-level classification model are data of all the items in the shopping place, and the data used by the second-level classification model are the data of the similar items in the shopping place.

The trained second-level classification model performs classification to the item in the first rectangular area image and the remaining rectangular area image corresponding to the similar item to obtain N secondary classification results corresponding to the similar item. Each secondary classification result is also one p-dimensional vector, and each element in the vector represents a probability that the items to be classified belongs to each of the p similar items according to the second-level classification model. When the number of the pictures is five, the secondary classification results are five p-dimensional vectors, and p is smaller than or equal to O and represents the total number of similar items in the shopping place.

In practice, there are multiple groups of similar items in the shopping place. For example, one group of similar items comprise Golden Delicious apples and yellow snowflake pears, another group of similar items comprise loose-packed salt and loose-packed white sugar, and yet another group of similar items comprise dietary alkali and flour. One second-level classification model can be trained for all the groups of similar items. In order to further improve accuracy of item classification, one second-level classification model is trained for each group of similar items. At this point, if the first-level classification result is similar items, the second-level classification model corresponding to the first-level classification result is called.

When the second-level classification model is trained, the secondary classification results outputted by the second-level classification model are used as inputs of the second-level linear regression model, and correct classifications of the items included in the pictures corresponding to the secondary classification results are used as outputs of the second-level linear regression model, so as to train the second-level linear regression model. The trained second-level linear regression model carries out data fusion on the N secondary classification results corresponding to the similar item to obtain one second-level classification result, and the second-level classification result is used as a first classification result of the similar item. The second-level classification result represents that the second-level linear regression model predicts to which category of item in the shopping place the item in the picture belongs.

In step 206, checkout of the M items is performed according to the first classification result of each of the items.

After the first classification results are obtained, the item prices corresponding to the first classification results are then obtained, and the prices of the M items placed on the checkout counter are obtained, so the cost that the customer needs to pay for the M items is determined. The item name, item price and the payment may be displayed through a display on the checkout counter, and the item name may also be reminded to the customer by voice. When the customer pays, the payment can be completed by scanning a two-dimensional code displayed on the display or aligning a two-dimensional code of an account in a mobile terminal to a code scanning terminal on the checkout counter.

In order to avoid classification error and improve the accuracy of checkout, referring to FIG. 3, before step 206, the method further comprises the following step 207.

In step 207, it is determined whether the item in the pictures is consistent with the first classification result according to the first rectangular area images and the remaining rectangular area images corresponding to each of the items, and a pre-trained support vector machine model corresponding to the first classification result of the item, if the item in the pictures is consistent with the first classification result, the above step 206 is performed; otherwise, a customer is reminded that the item is out of stock.

Specifically, a machine learning model of the support vector machine (or called as a support vector machine model) is established for each of the items in the shopping place, i.e., each of the items has the corresponding support vector machine model, and the model is trained by using the data corresponding to the item in the data set established in step 203. When the first-level classification model is established, an intermediate calculation result that is a vector with a length of 1024, exists. This vector may be viewed as a feature of the picture, thereby establishing a support vector machine model for determining whether the item is an item of a certain category from this vector.

After the first classification result of each of the items is obtained, the item contained in the first rectangular area images and the remaining rectangular area images of the N pictures is determined respectively by adopting the support vector machine model corresponding to the first classification result of one item to obtain N preliminary determination results, and this preliminary determination result represents whether the item in each of the pictures is consistent with the first classification result. If the number of the first rectangular area images and remaining rectangular area images is N, the total number of preliminary determination results is N. If the number of consistent results in the N preliminary determination results is greater than or equal to a preset threshold, it is determined that the item in this picture is consistent with the first classification result; otherwise, the customer is reminded that the item is out of stock, i.e., no checkout can be performed. This item may be marked in the picture acquired at the first shooting angle to indicate that checkout of this item of the M items cannot be performed, and the information is displayed through the display to remind the customer. If the number N of the pictures is five, the preset threshold is three and the five preliminary determination results are sequentially: consistent, consistent, inconsistent, inconsistent, consistent, the number of consistent results is three. Since the number of consistent results is equal to the preset threshold, the support vector machine model determines that the item in the pictures is consistent with the first classification result, it is considered that the above-mentioned classification process is correct, i.e., a correct item is identified, and at this moment the customer can obtain the item through checkout. If the five preliminary determination results are sequentially: inconsistent, inconsistent, inconsistent, inconsistent and consistent, the number of the consistent result is one. Since the number of the consistent result is smaller than the preset threshold, the support vector machine model determines that the item in the pictures is inconsistent with the first classification result, and it is considered that the above-mentioned classification process is unsuccessful, i.e., identification fails, and at this moment voice and/or image is adopted to remind "this item does not exist in the stock and cannot be identified" to remind the customer that the checkout of this item cannot be performed. In such way, the determination of the M items can be completed by using the support vector machine model cyclically.

Figure 4:
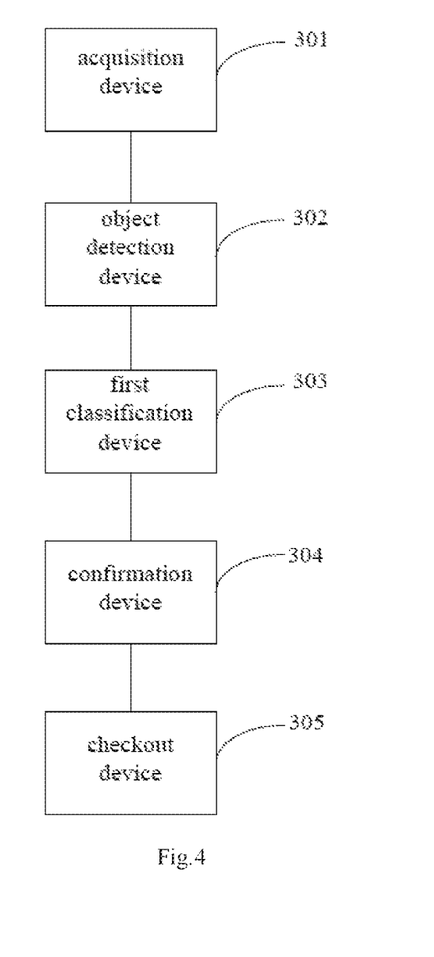
FIG. 4 illustrates a structural schematic diagram of a checkout apparatus based on the image identification technique of convolutional neural network provided in an embodiment of the present invention.

One embodiment of the present invention provides the checkout apparatus based on the image identification technique of convolutional neural network, which comprises the acquisition device 301, the object detection device 302, the first classification device 303, the confirmation device 304 and the checkout device 305.

The acquisition device 301 is configured to acquire N pictures of M items to be classified placed on a checkout counter, wherein the N pictures correspond to N shooting angles one to one, the N shooting angles have at least one first shooting angle, the first shooting angle is the shooting angle for shooting the M items downwards from a position just above the M items, and M and N are natural numbers greater than or equal to 2.

Preferably, the acquisition device 301 is cameras, wherein one camera is disposed just above the M items to be classified, so as to acquire the picture by shooting the M items downwards from just above, and four cameras are disposed around the M items to be classified, so as to acquire the pictures by shooting the M items obliquely downwards.

The object detection device 302 is configured to perform the object detection in the picture acquired at the first shooting angle firstly to obtain M first rectangular area images corresponding to the M items one to one, and respectively perform the object detection in the remaining pictures of the N pictures according to the number of the first rectangular area images to obtain M remaining rectangular area images corresponding to the M items one to one in each of the pictures.

The first classification device 303 is configured to obtain N preliminary classification results corresponding to each of the items according to the first rectangular area images, the remaining rectangular area images and a pre-trained first-level classification model, and obtain a first-level classification result corresponding to each of the items according to the N preliminary classification results corresponding to each of the items and a pre-trained first-level linear regression model. The first-level classification model is the model that is constructed by the image identification technique of convolutional neural network and trained by all the items in the shopping place.

The confirmation device 304 is configured to use the first-level classification result corresponding to each of the items as the first classification result of each of the items.

The checkout device 305 is configured to perform checkout of the M items according to the first classification result of each of the items.

The checkout apparatus further comprises a second classification device configured to obtain N secondary classification results corresponding to a similar item according to the first rectangular area image and the remaining rectangular area image corresponding to the similar item, and a pre-trained second-level classification model, obtain a second-level classification result corresponding to the similar item according to the N secondary classification results and a pre-trained second-level linear regression model, and use the second-level classification result as the first classification result of the similar item, in case that the first-level classification result indicates the similar item, wherein the second-level classification model is a model that is constructed by the image identification technique of convolutional neural network and pre-trained by similar items in the shopping place; correspondingly, in case that the first-level classification result indicates a similar item, the checkout device performs checkout according to the second-level classification result obtained by the second classification device; otherwise, the checkout device performs checkout according to the first-level classification result obtained by the first classification device.

The checkout apparatus further comprises: a determination device configured to determine whether the item in the pictures is consistent with the first classification result according to the first rectangular area images and the remaining rectangular area images corresponding to each of the items, and a pre-trained support vector machine model corresponding to the first classification result of each of the items; and a selection device configured to call the checkout device, in case that the item in the pictures is consistent with the first classification result; otherwise, reminding a customer that the item is out of stock.

It should be noted, with regard to the specific description about the acquisition device 301, reference can be made to the relevant contents in step 101 and step 201 in the above-mentioned embodiments; with regard to the specific description about the object detection device 302, reference can be made to the relevant contents in step 102 and step 203 in the above-mentioned embodiments; with regard to the specific description about the first classification device 303, reference can be made to the relevant contents in step 103 and step 203 in the above-mentioned embodiments; with regard to the specific description about the confirmation device 304, reference can be made to the relevant contents in step 104 and step 204 in the above-mentioned embodiments; with regard to the specific description about the checkout device 305, reference can be made to the relevant content in steps 105 and step 206 in the above-mentioned embodiments; with regard to the specific description about the second classification device, reference can be made to the relevant content in step 205 in the above-mentioned embodiments; and with regard to the specific description about the determination device and the selection device, reference can be made to the relevant content in step 207 in the above-mentioned embodiments, which are thus not repetitively described one by one here.

One embodiment of the present invention provides the checkout apparatus based on the image identification technique of convolutional neural network, which comprises cameras, a processor and a memory.

The N cameras are used for acquiring N pictures of M items to be classified placed on the checkout counter, wherein the N pictures correspond to N shooting angles one to one, the N shooting angles have at least one first shooting angle, and the first shooting angle is the shooting angle for shooting the M items downwards from a position just above the M items. The memory is configured to record processor-executable instructions. The processor is configured to perform an object detection in the picture acquired at the first shooting angle firstly to obtain M first rectangular area images corresponding to the M items one to one, perform the object detection in remaining pictures of the N pictures respectively, to obtain M remaining rectangular area images corresponding to the M items one to one in each of the pictures, according to the number of the first rectangular area images; obtain N preliminary classification results corresponding to each of the items according to the first rectangular area images, the remaining rectangular area images and a pre-trained first-level classification model, and obtain a first-level classification result corresponding to each of the items according to the N preliminary classification results corresponding to each of the items and a pre-trained first-level linear regression model, wherein the first-level classification model is a model that is constructed by the image identification technique of convolutional neural network and trained by all the items in the shopping place; use the first-level classification result corresponding to each of the items as a first classification result of each of the items; and perform checkout of the M items according to the first classification result of each of the items, wherein M and N are natural numbers greater than or equal to 2.

The processor is further configured to obtain N secondary classification results corresponding to a similar item according to the first rectangular area image and the remaining rectangular area image corresponding to the similar item, and a pre-trained second-level classification model, obtain a second-level classification result corresponding to the similar item according to the N secondary classification results and a pre-trained second-level linear regression model, and use the second-level classification result as the first classification result of the similar item, in case that the first-level classification result indicates the similar item, wherein the second-level classification model is a model that is constructed by the image identification technique of convolutional neural network and pre-trained by similar items in the shopping place; otherwise, use the first-level classification result as the first classification result.

The specific process of the present method will be described below.

The customer placed a bottle of mineral water and a bag of sunflower seeds on a weighing platform for checkout. When an electronic weighing scale on the weighing detects the change in weight and the weight tends to be stable, data are collected from five cameras, and five pictures are acquired. The five pictures are uniformly enlarged or shrunk to a certain preset size. Then, an object detection model is used for detecting items in the pictures acquired from just above. The detection result is to find two rectangular areas containing the items in the picture. Since the number of the items is two, the number of the rectangular areas is also two. Then, the object detection model is used for detecting the two items in the four remaining pictures, and the detection result is also to find two rectangular areas containing the items in each of the pictures. Then, a first-level classification model is used for classifying each rectangular area corresponding to each of the items to obtain a probability that each of the items belongs to the items of each category. Then, all probability results of each of the items pass through a first-level linear regression model to obtain a first-level classification result of each of the items in all item categories. In case that the first-level classification result indicates the item category which needs to be further classified by using the second-level classification model, the corresponding second-level classification model is called to classify each rectangular frame to obtain the probability value that this object belongs to each category, and then the second-level linear regression model is used to obtain the classification result of this object in all item categories. Finally, the support vector machine model (or called as a small model) for this category is used for determining rectangular frames in the five pictures, so as to determine whether this item belongs to this category. If so, this item category is returned; if not, it is considered that this item does not belong to any one item category.

To sum up, the embodiments of the present invention bring out the following beneficial effects.

The items can be accurately identified, so as to facilitate the self-service checkout.

It can be known from common technical knowledge that the present invention can be implemented by other embodiments without departing from the spirit essence or necessary characteristics of the present invention. Therefore, the above-mentioned disclosed embodiments, in all aspects, merely are used for illustration rather than limitation. All changes made in the scope of the present invention or the scope equivalent to the present invention shall fall within the present invention.

What is claimed is:

1. A checkout method based on an image identification technique of convolutional neural network comprising:

acquiring N pictures of M items to be classified placed on a checkout counter, the N pictures corresponding to N shooting angles one to one, the N shooting angles have at least one first shooting angle, and the first shooting angle is a shooting angle for shooting the M items downwards from a position just above the M items;

performing object detection in the picture acquired at the first shooting angle firstly to obtain M first rectangular area images corresponding to the M items one to one, and performing the object detection in the remaining pictures of the N pictures respectively, to obtain M remaining rectangular area images corresponding to the M items one to one in each of the pictures, according to the number of the first rectangular area images;

obtaining N preliminary classification results corresponding to each of the items according to the first rectangular area images, the remaining rectangular area images and a pre-trained first-level classification model, and obtaining a first-level classification result corresponding to each of the items according to the N preliminary classification results corresponding to each of the items and a pre-trained first-level linear regression model, the first-level classification model is a model that is constructed by the image identification technique of convolutional neural network and trained by all the items in the shopping place;

using the first-level classification result corresponding to each of the items as a first classification result of each of the items; and
performing checkout of the M items according to the first classification result of each of the items,
M and N being natural numbers greater than or equal to 2.

2. The checkout method according to claim 1, wherein after the obtaining N preliminary classification results and before the using the first-level classification result corresponding to each of the items as a first classification result of each of the items, the checkout method further comprises
obtaining N secondary classification results corresponding to a similar item according to the first rectangular area image and the remaining rectangular area image corresponding to the similar item, and a pre-trained second-level classification model, obtaining a second-level classification result corresponding to the similar item according to the N secondary classification results and a pre-trained second-level linear regression model, and using the second-level classification result as the first classification result of the similar item and using the first-level classification result corresponding to each of the items as a first classification result of each of the items, in case that the first-level classification result indicates the similar item, the second-level classification model being a model that is constructed by the image identification technique of convolutional neural network and pre-trained by similar items in the shopping place.

3. The checkout method according to claim 1, wherein after the using the first-level classification result corresponding to each of the items as a first classification result of each of the items and before the performing checkout, the checkout method further comprises
determining whether the item in the pictures is consistent with the first classification result according to the first rectangular area image and the remaining rectangular area image corresponding to each of the items, and a pre-trained support vector machine model corresponding to the first classification result of each of the items, in case that the item in the images is consistent with the first classification result, performing checkout; otherwise, reminding a customer that the item is out of stock.

4. The checkout method according to claim 1, wherein
one camera is disposed just above the M items to be classified, so as to acquire the picture by shooting the M items downwards from just above; and
four cameras are disposed around the M items to be classified, so as to acquire the pictures by shooting the M items obliquely downwards.

5. A checkout apparatus based on an image identification technique of convolutional neural network, comprising:
an acquisition device configured to acquire N pictures of M items to be classified placed on a checkout counter, the N pictures corresponding to N shooting angles one to one, the N shooting angles have at least one first shooting angle, and the first shooting angle is the shooting angle for shooting the M items downwards from a position just above the M items;
an object detection device configured to firstly perform object detection in the picture acquired at the first shooting angle to obtain M first rectangular area images corresponding to the M items one to one, and perform the object detection in the remaining pictures of the N pictures respectively, to obtain M remaining rectangular area images corresponding to the M items one to one in each of the pictures, according to the number of the first rectangular area images;
a first classification device configured to obtain N preliminary classification results corresponding to each of the items according to the first rectangular area images, the remaining rectangular area images and a pre-trained first-level classification model, and obtain a first-level classification result corresponding to each of the items according to the N preliminary classification results corresponding to each of the items and a pre-trained first-level linear regression model, the first-level classification model being a model that is constructed by the image identification technique of convolutional neural network and trained by all the items in the shopping place;
a confirmation device configured to use the first-level classification result corresponding to each of the items as a first classification result of each of the items; and
a checkout device configured to perform checkout of the M items according to the first classification result of each of the items,
M and N being natural numbers greater than or equal to 2.

6. The checkout apparatus according to claim 5, further comprising
a second classification device configured to obtain N secondary classification results corresponding to a similar item according to the first rectangular area image and the remaining rectangular area image corresponding to the similar item, and a pre-trained second-level classification model, obtain a second-level classification result corresponding to the similar item according to the N secondary classification results and a pre-trained second-level linear regression model, and use the second-level classification result as the first classification result of the similar item, in case that the first-level classification result indicates the similar item, the second-level classification model being a model that is constructed by the image identification technique of convolutional neural network and pre-trained by similar items in the shopping place;
correspondingly, in case that the first-level classification result indicates a similar item, the checkout device performs checkout according to the second-level classification result obtained by the second classification device, otherwise, the checkout device performs checkout according to the first-level classification result obtained by the first classification device.

7. The checkout apparatus according to claim 5, the checkout apparatus further comprising
a determination device configured to determine whether the item in the pictures is consistent with the first classification result according to the first rectangular area image and the remaining rectangular area image corresponding to each of the items, and a pre-trained support vector machine model corresponding to the first classification result of each of the items; and
a selection device configured to call the checkout device, in case that the item in the images is consistent with the first classification result; otherwise, remind a customer that the item is out of stock.

8. The checkout apparatus according to claim 5, wherein the acquisition device is cameras, one camera disposed just above the M items to be classified, so as to acquire the picture by shooting the M items downwards from just above, and four cameras disposed around the M items to be classified, so as to acquire the pictures by shooting the M items obliquely downwards.

9. A checkout apparatus based on an image identification technique of convolutional neural network, comprising:

N cameras configured to acquire N pictures of M items to be classified placed on a checkout counter, the N pictures corresponding to N shooting angles one to one, the N shooting angles have at least one first shooting angle, and the first shooting angle is the shooting angle for shooting the M items downwards from a position just above the M items;

a processor; and a memory configured to record processor-executable instructions, the processor configured to perform object detection in the picture acquired at the first shooting angle firstly to obtain M first rectangular area images corresponding to the M items one to one, perform the object detection in the remaining pictures of the N pictures respectively, to obtain M remaining rectangular area images corresponding to the M items one to one in each of the pictures, according to the number of the first rectangular area images, obtain N preliminary classification results corresponding to each of the items according to the first rectangular area images, the remaining rectangular area images and a pre-trained first-level classification model, obtain a first-level classification result corresponding to each of the items according to the N preliminary classification results corresponding to each of the items and a pre-trained first-level linear regression model, the first-level classification model being a model that is constructed by the image identification technique of convolutional neural network and trained by all the items in the shopping place, use the first-level classification result corresponding to each of the items as a first classification result of each of the items, and perform checkout of the M items according to the first classification result of each of the items, M and N being natural numbers greater than or equal to 2.

10. The checkout apparatus according to claim 9, wherein the processor is further configured to obtain N secondary classification results corresponding to a similar item according to the first rectangular area image and the remaining rectangular area image corresponding to the similar item, and a pre-trained second-level classification model, obtain a second-level classification result corresponding to the similar item according to the N secondary classification results and a pre-trained second-level linear regression model, and use the second-level classification result as the first classification result of the similar item, in case that the first-level classification result indicates the similar item, the second-level classification model is-being a model that is constructed by the image identification technique of convolutional neural network and pre-trained by similar items in the shopping place; otherwise, use the first-level classification result as the first classification result.

* * * * *